United States Patent
Neumann

(10) Patent No.: US 9,424,003 B1
(45) Date of Patent: Aug. 23, 2016

(54) SCHEMA-LESS SYSTEM OUTPUT OBJECT PARSER AND CODE GENERATOR

(71) Applicant: EMC Corporation, Hopkinton, MA (US)

(72) Inventor: Bryan D. Neumann, Garner, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/523,466

(22) Filed: Oct. 24, 2014

(51) Int. Cl.
G06F 9/44 (2006.01)

(52) U.S. Cl.
CPC .. *G06F 8/30* (2013.01); *G06F 8/36* (2013.01)

(58) Field of Classification Search
CPC ........................................................ G06F 9/44
USPC ........ 717/104, 106, 107, 108, 110, 114, 120
See application file for complete search history.

(56) References Cited

U.S. PATENT DOCUMENTS

| 6,742,175 | B1* | 5/2004 | Brassard ................... G06F 8/71 717/107 |
| 8,306,057 | B1* | 11/2012 | Khan ..................... H04W 48/08 370/401 |
| 2001/0044811 | A1* | 11/2001 | Ballantyne et al. .......... 707/513 |
| 2005/0026129 | A1* | 2/2005 | Rogers .......................... 434/322 |
| 2010/0321715 | A1* | 12/2010 | Williams ..................... 358/1.13 |
| 2012/0265643 | A1* | 10/2012 | Vandervort ................ 705/26.61 |
| 2014/0149452 | A1* | 5/2014 | Nguyen et al. ............... 707/769 |
| 2014/0214897 | A1* | 7/2014 | Zhu .................... G06F 17/30477 707/771 |

OTHER PUBLICATIONS

"Extending a methodology for migration of the database layer to the cloud considering relational database schema migration to NoSQL" by Rilinda Lamllari [online], Jun. 2013, [retrieved on Mar. 2015] <http://elib.uni-stuttgart.de/opus/volltexte/2013/8762/pdf/MSTR_3460.pdf>.*

"JSON Data Management-Supporting Schema-less Development in RDBMS" by Oracle Corporation, [online], Jun. 2014, [retrieved on Mar. 2015] <http://delivery.acm.org/10.1145/2600000/2595628/p1247-liu.pdf?ip=151.207.250.71&id=2595628&acc>.*

"Towards Automated Polyglot Persistence" by University of Hamburg, [online], [retrieved on Mar. 2015] <http://www.btw-2015.de/res/proceedings/Hauptband/Wiss/Schaarschmidt-Towards Automated Po.pdf>.*

* cited by examiner

*Primary Examiner* — Chat Do
*Assistant Examiner* — Jae Jeon
(74) *Attorney, Agent, or Firm* — Barry N. Young

(57) ABSTRACT

A schema-less system output object parser and code generation process analyzes an instance of a response object from a system, such as a storage array, having components of multiple different types, formats and communications protocols, and automatically generates middleware Java source code to translate and communicate requests and responses between the different components and client applications. Output response objects responding to application requests are annotated and parsed, and data structures are created and initialized with keys and key value variables to generate source code to handle live data.

18 Claims, 9 Drawing Sheets

SCHEMA-LESS SYSTEM OUTPUT OBJECT PARSER AND CODE GENERATOR

BACKGROUND

This invention relates generally to middleware tools and processes for computer systems for communicating between disparate applications and systems that utilize different languages and/or communications protocols, and more particularly to schema-less middleware methods and apparatus that automatically parse and generate code to translate and communicate commands and responses between such applications and systems without the necessity of creating individualized logic for each different type of system and application.

Large enterprises typically employ multiple different computer hardware and software platforms comprising different types of computer systems and applications that must interface and communicate with each other. Generally, these systems and applications employ different languages and communication protocols, and interfacing the systems and applications requires a great deal of custom middleware that must be individualized for each different system and each different application. Creating and maintaining this middleware is a resource intensive operation. Every upgrade or new release of software by manufacturers of such systems and applications generally requires an upgrade or rewrite of corresponding middleware. This may require rewriting a large number of lines of middleware code (for example, several thousand lines of code) which can require significant periods of time and resources. For instance, an enterprise may have a distributed storage system comprising a plurality of different types and versions of storage arrays to which its employees and/or customers must interface using multiple different types and versions of client applications. Middleware individualized for interfacing each different storage array and/or application must be provided and maintained. Every time a change is made in a storage array or a new or changed application is introduced, new or changed middleware is required. In addition to the effort required for updating the middleware to accommodate the changes, generating or rewriting large amounts of middleware code inevitably introduces programming bugs. Finding and correcting these often requires significant effort.

It is desirable to provide tools and processes for automatically generating and updating middleware code that interfaces disparate computer systems and applications to accommodate changes in such computer systems and applications, and it is to these ends that the present invention is directed.

DESCRIPTION OF PREFERRED EMBODIMENTS

Figure 1:
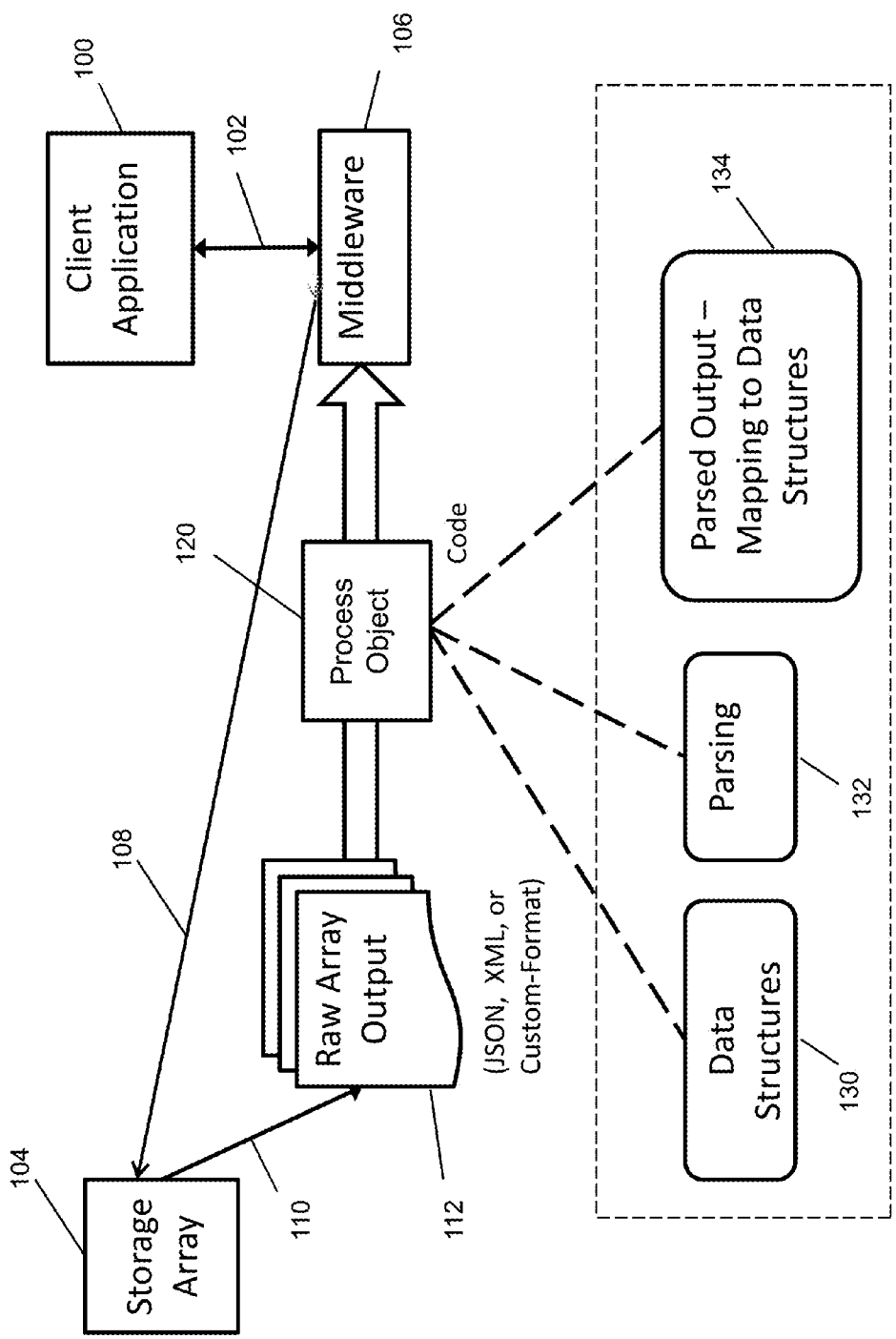
FIG. 1 is a block diagram illustrating the use of a tool and process in accordance with the invention for constructing a middleware interface between a storage array and a client application.

The invention is particularly well adapted to automatically generating middleware software code for interfacing and communicating between multiple disparate storage arrays and client applications, and will be described in that context. It will be appreciated, however, that this is illustrative of only one utility of the invention, and that the invention may be employed for generating other types of interfaces and software code for use with other kinds of systems and applications.

As will be described in more detail, the invention affords a computer implemented process for creating a language and protocol independent schema-less middleware method and system (referred to herein as "Polyglot") that automatically converts commands/requests to systems from applications, parses response objects from the systems, and generates source code to translate and communicate real live commands and responses between different applications and systems without the necessity of creating individualized middleware logic for handling each different system and application. As such, the invention obviates the need for developing and maintaining large amounts of customized middleware code that is individualized to particular applications and systems. It reduces the effort required to write middleware from what historically may have taken days or weeks into a matter of hours. Moreover, it significantly increases reliability, speed and stability by allowing solutions to reach the market quicker and to perform more reliably. Consequently, the invention affords the ability to quickly add an update support for a manufacturer's platforms, which is often critical and directly affects the number of licenses for the platforms which the manufacturer is able to sell.

As will further be described in more detail, the Polyglot method and system of the invention comprises a tool that employs a domain specific language (DSL) and a Java code generator. It unifies application program interface (API) consumption, rather than the APIs themselves, which allows developers to focus on solution-specific code instead of writing, testing and fixing error-prone array output processing code. The invention differs from other tools which require a specific type of data description or schema in order to generate source code by requiring neither a schema nor a formal data exchange format in order to generate source code. Rather, it requires only a system output (response object) to a request or command in order to generate source code. It creates annotated output format (AOF) files comprising a response object output from a storage array or other system that is annotated in accordance with the invention. The AOF file is processed by the Polyglot tool to generate code describing system objects, relationships and parsing behavior. Polyglot DSL defines a set of keywords for annotating captured response objects as well as support for regular expressions, and provides custom data types such as @Boolean for "TRUE", "FALSE", "yes", "no", @Double, @Percent, @Date, etc., even for formats such as JSON ("Java Serial Object Notation") for which different tools are available. The invention allows one to provide extensive annotations to handle various response implementations, which is especially advantageous for systems that provide a pseudo "RESTful" API, with large data sets having embedded values keyed to a very few keys. More details and advantages of the invention will become apparent from the following description.

FIG. 1 is a block diagram giving an overview of the invention as used to provide a middleware interface between a storage array and a client application. As shown, a client application 100 may send a request 102 intended for a storage array 104 via middleware software code 106. The client application request may seek information from the storage array related to statistics and topological information, such as for example, logical unit numbers (LUNs), file systems, hardware, etc. The middleware will format the request as a request object and forward at 108 the request object to the storage array 104. In response to the request object, the storage array may respond at 110 with one or more response objects each comprising a raw array output 112 of the storage array formatted in JSON, XML or some other custom format, for instance. The raw array output 112, in turn, may be processed by the schema-less object middleware processing code and system 120 (Polyglot) of the invention to convert the response to a format defined for the client application 100. The Polygot code 120 as well as middleware 106 may be resident on a computer readable medium on a computer, such as a server, and may comprise executable instructions for controlling the operations of the computer to perform the operations described herein.

As shown in FIG. 1, and as will be described in more detail below, Polyglot 120 may generate data structures 130, parse the raw array response objects at 132 using a predefined grammar or dialect determined by the attributes of the response object, and map the parsed response objects to the data structures at 134 to create the code for the middleware to convert automatically the response object from the storage array format to a format that is appropriate to the client application. Moreover, if the storage array 104 comprises multiple different types, classes and versions of storage systems, and supplies response objects in multiple different formats, as is typically the case, Polyglot will generate code that will automatically and transparently to the user convert each of the various response objects to an appropriate client application format, as will be described more fully below. As such, the invention avoids the necessity of creating individualized middleware code to handle multiple different storage array and client application formats. The significance of this aspect of the invention may be appreciated by considering a conventional individualized process required to handle each different response object format from a system such as a storage array, as illustrated in FIG. 2.

Figure 2:
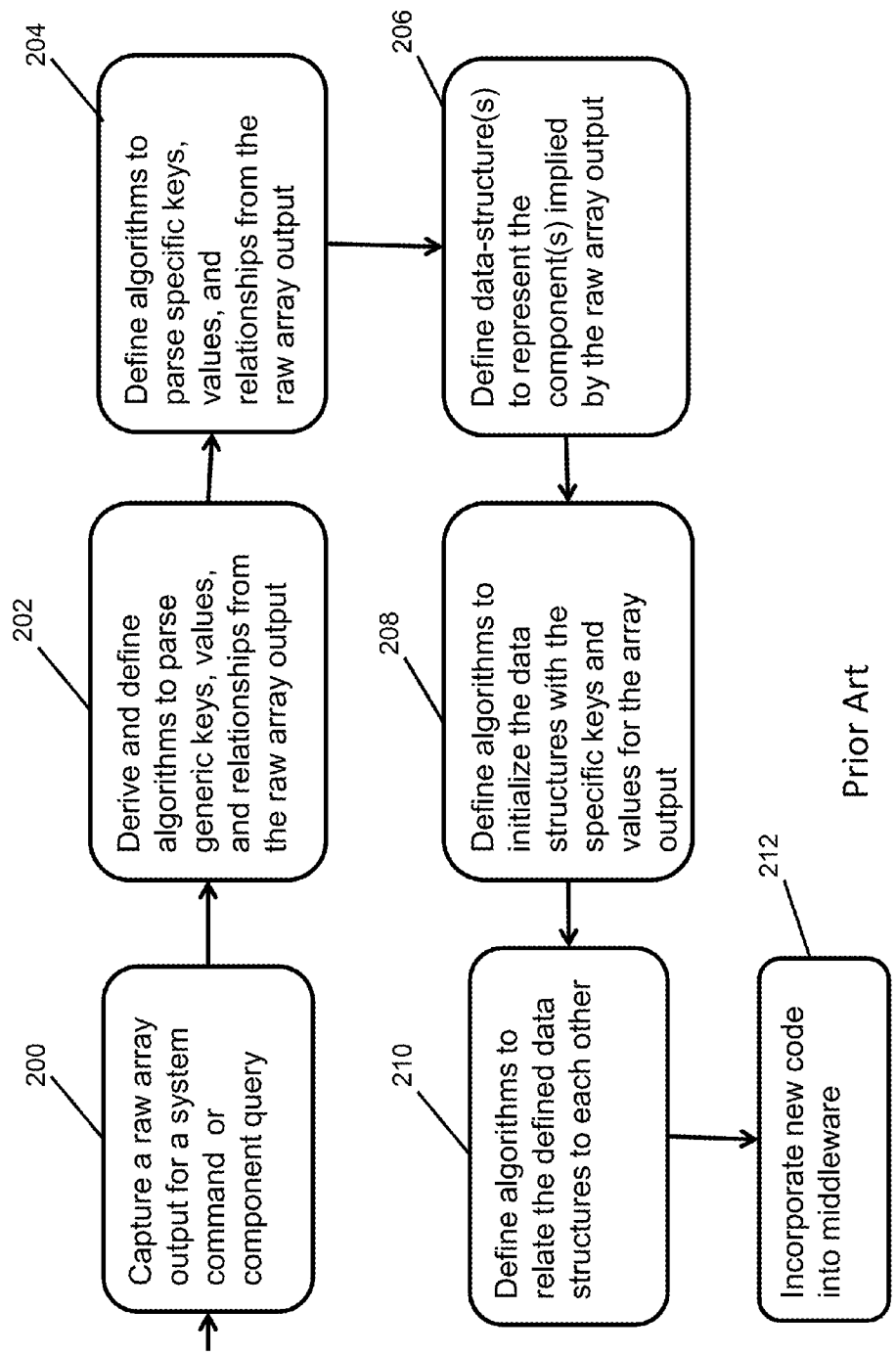
FIG. 2 is a block diagram illustrating a prior art manual process for creating middleware code.

FIG. 2 illustrates the various steps of prior art process conventionally required to generate middleware code to enable the middleware to process a system output response object having a particular format. The various steps of the prior art process illustrated in FIG. 2 have to be performed manually for each individual raw array output response to a given system or storage command or component of interest in order to get the raw output into the middleware. This requires extracting from the raw output of a storage array or system the keys and values relevant to a request, and capturing the data in data structures which can be incorporated into the middleware by way of a build configuration.

Referring to FIG. 2, the raw array output corresponding to a particular system or component query is captured at 200. At 202, algorithms are derived and defined to parse generic keys, values, and relationships from the raw array output. Next, at 204 other algorithms are defined to parse specific keys, values and relationships from the raw array output. At 206, one or more data structures are defined to represent the components implied by the raw array output. At 208, algorithms are defined to initialize the data structures with the specific keys and values for the array output, and at 210, other algorithms are defined to relate the defined data structures to one another. Finally, at 212 new code specific to the particular raw array output is incorporated into the middleware to handle that output. These prior art steps typically must all be performed manually for each storage array.

Handling responses from command outputs on an array requires code to perform line-by-line processing. Generating this code can be a tedious and error-prone endeavor due to variations in the command outputs on different arrays having different operating environments, and depending upon a customer's environment and the features that are installed. Lines of the array output may contain, for example, inconsistent keys and values, and frequently be without a description of the data or schema.

Unlike the prior art process illustrated in FIG. 2, the Polyglot method and system afford a tool that allows interpretation of the output from many different storage arrays or systems. It is schema-less in that it does not require a particular schema or formal data exchange format, but instead employs a capture, annotate and deploy approach, where the output response from a storage array or other system is captured, the output response is annotated and saved as an AOF file, and Java code is generated and deployed to the middleware, as a system plug-in, for instance. This generated code provides both the domain model classes and parsers needed to interpret live data from the storage array or system, and the code is easily managed and integrated with an existing build configuration and source code.

Figure 3:
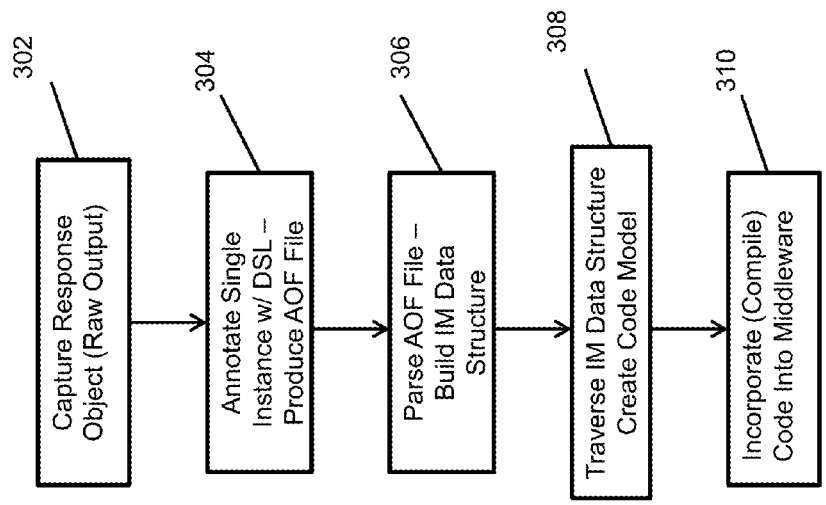
FIG. 3 is a block diagram giving an overview of process in accordance with the invention for automatically creating middleware source code that replaces a prior art manual process such as illustrated in FIG. 2.

FIG. 3 is a block diagram illustrating an overview of a workflow process in accordance with the invention. The first step 302 the process of FIG. 3 is to capture the response object which comprises a raw output from the storage array or system in response to a request from a client application. Next, at 304, a single instance of the response object is annotated to produce an array output format ("AOF") file. Annotation is done by the user utilizing a predefined domain specific language (DSL) which defines keyword terms which are used to annotate the AOF file. The keyword terms comprise key variable terms that replace key values of keys in the raw output file. A key variable term is preferably used to represent a key value. The capture and the annotate steps 302 and 304 of FIG. 3 will be described in more detail in connection with FIG. 4.

Next, at 306, the AOF file may be parsed line-by-line to build an intermediate model comprising a hierarchical data structure. At 308, the intermediate model data structure may be traversed to build a code model. At 310, the code model may be incorporated into the middleware to compile the code. These steps will be described in more detail in connection with FIGS. 6, 8 and 9. The code will be utilized by the middleware with real live data to provide response objects to the client application request objects.

Figure 4:
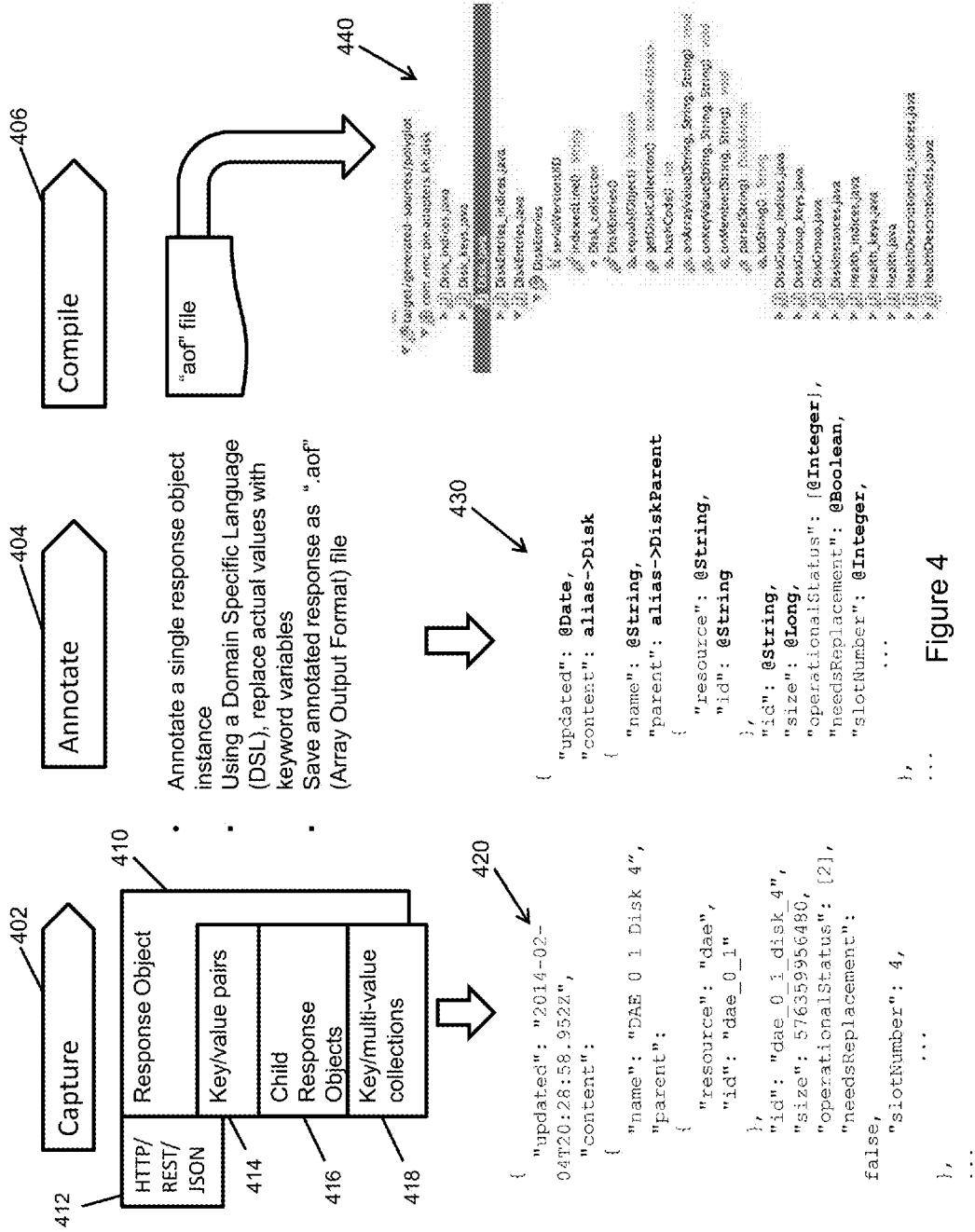
FIG. 4 is a diagrammatic view that illustrates in more detail an embodiment of part of the process of FIG. 3.

FIG. 4, as indicated above, is a diagrammatic view that illustrates in more detail preferred embodiments of portions of the process illustrated in FIG. 3. In particular, FIG. 4 illustrates an embodiment of a capture step 402 corresponding generally to step 302 of FIG. 3, an annotate step 404 corresponding generally to an embodiment of step 304 FIG. 3, and a compile step 406 corresponding to an embodiment of step 310 of FIG. 3.

As shown in FIG. 4, capture step 402 may capture a response object 410 from the storage array (or other system) responding to a request object, as from a client or other application, that was formatted and transported to the storage array or system from the middleware. The response object 410 may have a JSON format, for example, and it may be transported using a RESTful protocol on HTTP, as indicated at 412. Depending upon the request object sent to the storage array, the response object 410 may include key/value pairs 414, child response objects 416 and keys/multi-value collections 418, among others. Assuming, for example, that the request object requested the storage array to provide "all information on disks", the response object 410 would comprise a hierarchical file structure containing multiple keys and value pairs, and multiple parent-child relationships.

As an example, a snippet of JSON code corresponding to a portion of a possible raw response object to such a request object is illustrated at 420 below the diagrammatic illustration of the response object 410. As shown, the response object may include key fields such as a date field ("updated") and a corresponding data value indicating when the file was "updated". The response may also have "content" fields including, for example, "names", "resource" information, "id", "size", "operationalStatus", and whether it "needsReplacement", etc., with their corresponding key values.

Under the annotate step 404 of FIG. 4, an annotated snippet 430 of an AOF file corresponding to a single response object instance of the JSON snippet 420 of the raw array response object 410 is illustrated. As shown, the actual key values in the raw response object snippet 420 have been replaced in the annotated snippet 430 of the AOF file with pre-defined DSL keywords comprising key value variables. For instance, the actual value of the date for the "updated" key in the raw response object has been replaced with the DSL key value variable "@Date". Likewise, key values corresponding to keys such as "name", "id", etc., that have strings as values have been replaced with the DSL keyword variable "@String" to indicate that the key value of the corresponding key is a string. Similarly, other key values have been replaced with DSL key word variables such as "@Long", "@Integer", "@Boolean", etc. When the AOF file 430 is compiled at 406 to generate code, the compiled code will include the DSL key value variables, as shown in the snippet 440 of compiled Java code for the AOF file shown in FIG. 4. Accordingly, when the compiled code is executed on the real live data, for each instance of "disk" in the response object, the corresponding actual key values for each disk instance will be substituted for the key value variables in the response objects returned to the middleware. Thus, the compiled code comprises generic source code that is incorporated into the middleware, and it is applicable to any disk in the storage array. The middleware will return a response object to an application request for disk information with the appropriate information for all disks in the storage array. The code and the data structures in an intermediate model (to be described) can handle multiple instances of response object outputs without the necessity of regenerating the code for each different output and/or output protocol, as will be described in connection with FIG. 5. For large storage arrays comprising thousands of disks and enterprises having multiple different applications, this saves thousands of lines of code individualized for a particular type of disk, and greatly reduces the burden of maintaining the code to accommodate changes and upgrades.

Figure 5:
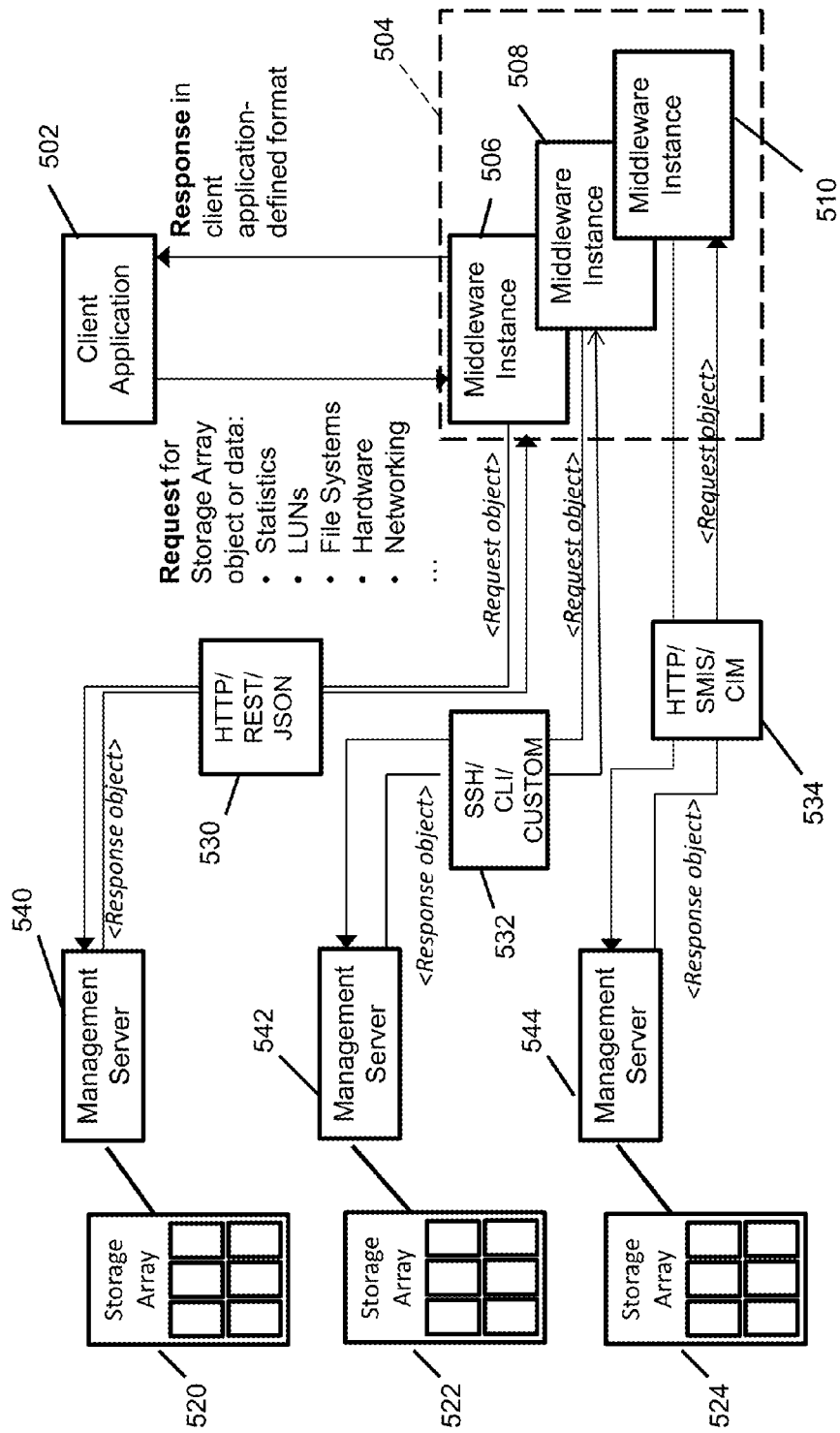
FIG. 5 is a block diagram illustrating the functionality and dependency of middleware code for interfacing storage arrays to a client application in accordance with the invention.

FIG. 5 is a block diagram that gives a higher-level view of the functionality and dependency of the middleware code for interfacing storage arrays to client applications. As shown in the figure, and as previously described, a client application 502 may issue a request for storage array object data to include information such as statistics, LUNs, file systems, hardware, networking, etc., to middleware software 504 comprising multiple instances 506, 508 and 510 of the middleware. Each middleware instance may comprise code tailored for particular disk types or classes, and each middleware instance may issue a request object formatted appropriately for particular types or classes of disks in a plurality of storage arrays 520, 522 and 524. As examples, and as shown, middleware instance 504 may format the request object for a JSON/REST format 530 that is transported using HTTP to a management server 540 of storage array 520. Similarly, middleware instance 506 may format the request object at 532 to have a custom CLI (command line interface) format which is transported via SSH (Secure Shell) to a management server 542 for storage array 522. Middleware instance 508 may likewise format the response object at 534 to have a CIM/SMIS format for transport via HTTP to a management server 544 for storage array 524.

Response objects from the storage arrays having the appropriate formats for the storage arrays and the request objects will be returned to the middleware instances 506, 508 and 510 with the response objects will be formatted in accordance with a client application defined format and returned to the client application 502. Each middleware instance may be appropriate to a particular type or class of storage array. Each middleware instance also will be aware of which storage array it is communicating with because it must first be authenticated with that array. Accordingly, when the middleware 504 receives a client application request, the middleware instances format that request according to the classes of storage arrays that are present and communicates the formatted requests to the corresponding storage arrays. Each middleware instance may have libraries which are used to format the requests for the appropriate protocols.

Generally client applications may be similar, and may have similar protocols. Many middleware instances may communicate with a number of different client applications, using, for example, a code layer between each middleware instance and the client application. In some embodiments, different interface code may be generated for different client applications, and may be stored in the middleware instances and used as required.

Figure 6:
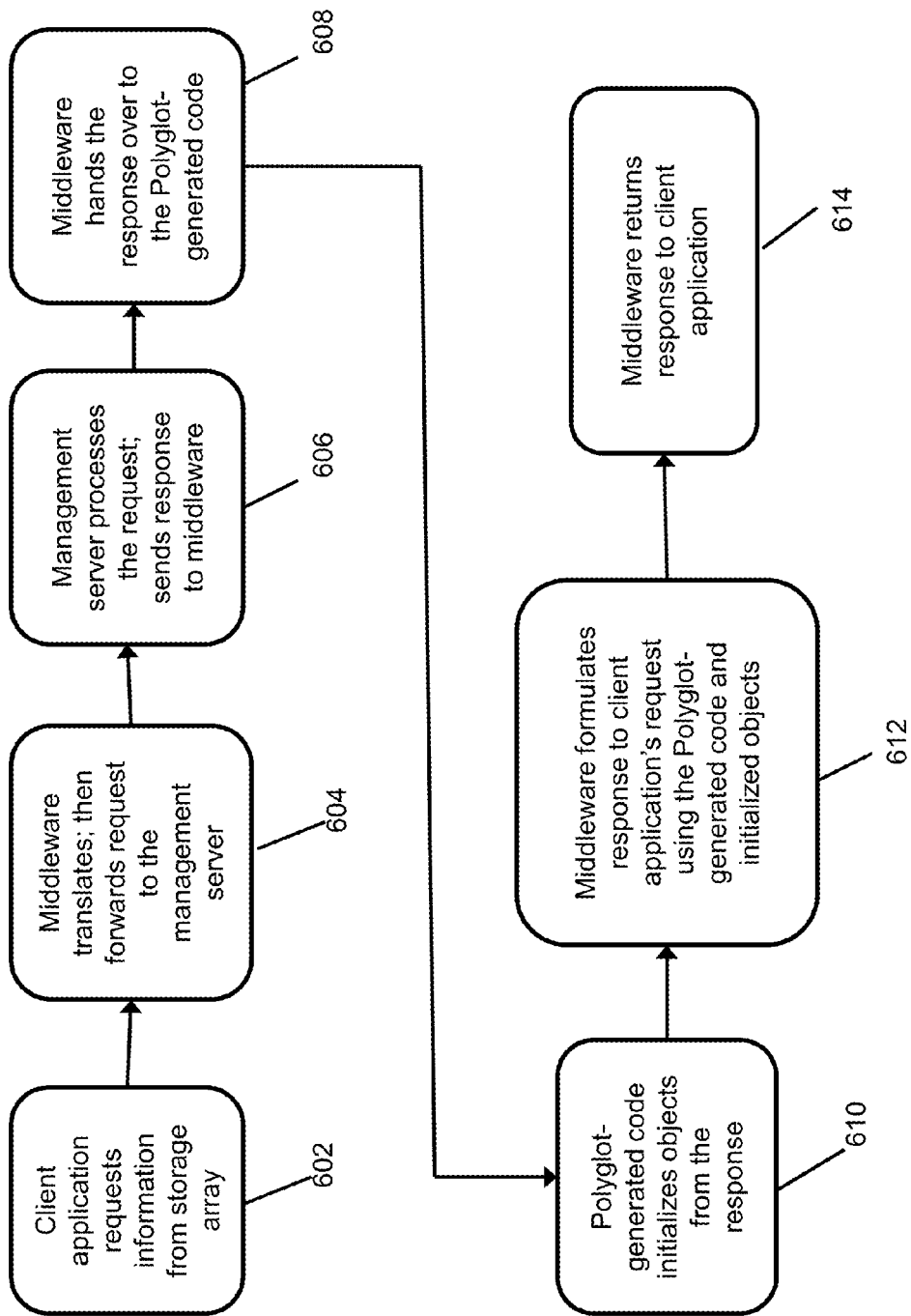
FIG. 6 is a block diagram illustrating in more detail the parsing of a response object of the process of FIG. 5.

FIG. 6 is a block diagram that illustrates an overview of the processing and the parsing of a response object of the process of FIG. 5. As used herein parsing refers to software controlled operations of a parser that analyze input data such as strings of symbols in the form of a data exchange format returned from the storage arrays in the response objects. Parsing, as previously described, may use a predefined grammar or dialect determined by the attributes of the input data to build data structures such as a parse tree, an abstract syntax tree or other hierarchical structure, and may map the input data to the data structures. This imparts a structural representation to the input data. A first step of parsing is referred to as lexing where the grammar is defined that is used to analyze the input data, and a next step is analyzing strings of input data to parse or extract the information desired. The AOF file is parsed by going through the file line-by-line to extract each line and break it up in predetermined ways so that it can be processed and mapped. The invention may employ as a parser a known computer based language parser generator, such as, for example, a parser generator known as ANTLR (ANother Tool for Language Recognition) which is actively maintained at the University of San Francisco Department of Computer Science.

FIG. 6 illustrates a process for parsing a response object. The process begins at 602 where a client application requests information from a storage array, for instance. The request may ask, for example, for all information on disks in the storage array. At 604, the middleware may translate the request and forwarded to a management server, such as management servers 540-544 shown in FIG. 5. At 606, the management server may process the request and respond back to the middleware with a response object. At 608, the middleware may pass the response object to the Polyglot generated code for analysis. At 610, the polyglot generated code may initialize itself from the response object. At 612, the middleware may formulate a response to the client application's request using the polyglot generated code and initialized objects, and at 614 the middleware may return the response to the client application.

Figure 7:
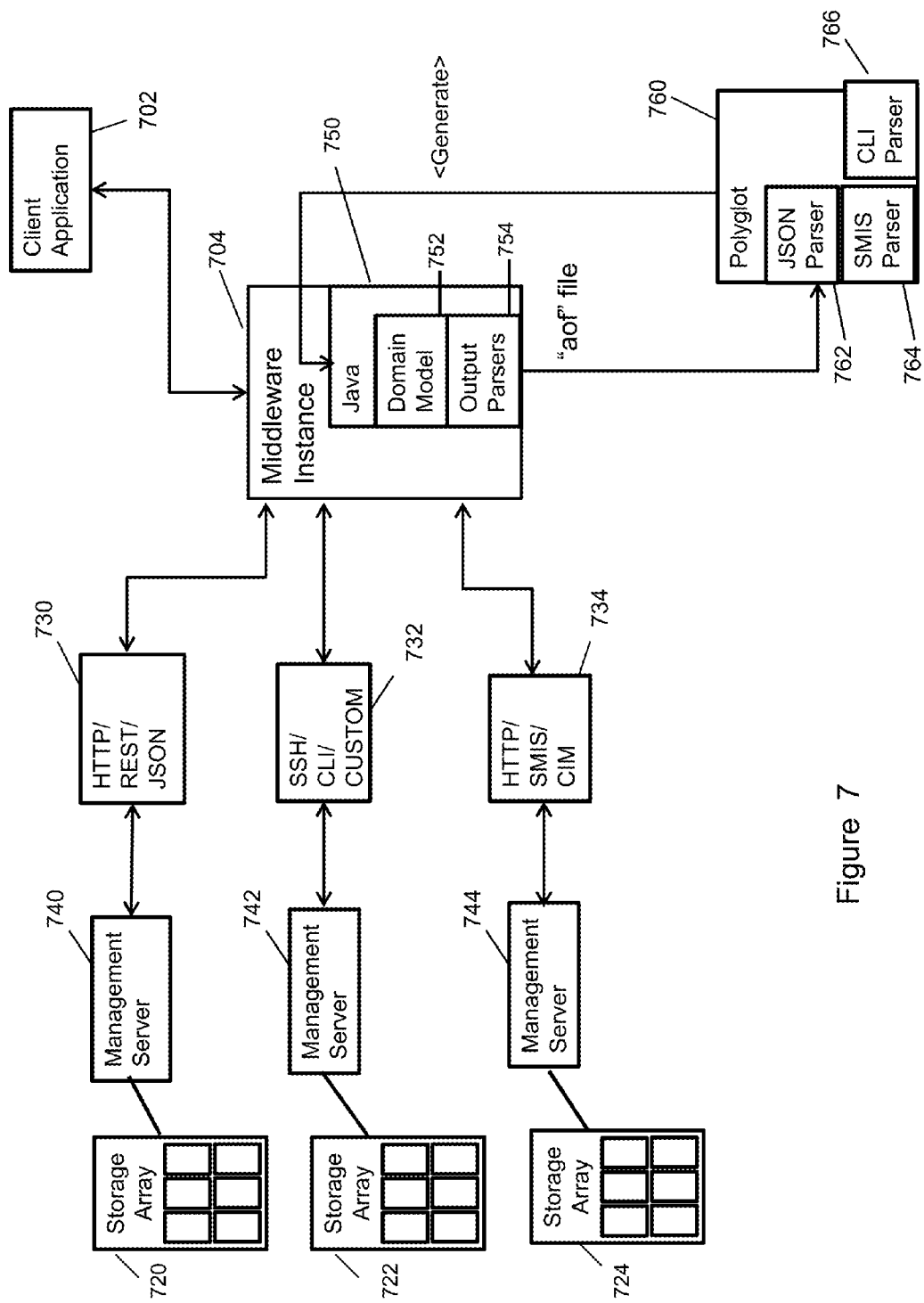
FIG. 7 is a block diagram illustrating in greater detail the functionality and dependency at the middleware code shown in FIG. 5.

FIG. 7, which is similar to FIG. 5, illustrates this process in somewhat more detail. Referring to FIG. 7, client application 102 may send a request to middleware instances 704 (only one such instance being shown in the figure) that format the request for storage arrays 720, 722, and 724. The middleware instances process the request and forward it to management servers for execution on the storage arrays. For storage array 720, the middleware instance may format and send a query (request) over HTTP/REST protocol format at 730 to a management server 740, and receive a JSON protocol response from the management server. For storage array 722, the middleware instances may format and transfer the query at 732 over an SSH/CLI protocol format to management server 742, and receive a custom protocol response. Similarly, for storage array 724, the middleware instances may format and send the query over HTTP to management server 744, and receive a CIM/SMIS format response. Response objects are returned from storage arrays 720-724 to the middleware instances 704 in the formatted protocols of the storage arrays.

The middleware instances 704 may contain Java code 750, a domain model 752, and output parsers 754 to process the response objects in the storage arrays and provide AOF files and associated dialects to the Polyglot generated code 760. The Polyglot code may comprise a JSON parser 762, an SMIS parser 764, and a CLI parser 766, among others, as are appropriate for the different protocols of the response objects from the storage arrays. Since the different storage arrays may have different protocols, the middleware instances have to deal with all of the different protocols. The Polyglot code serves as a translator of all of the response objects incoming to the middleware instances from the storage arrays to translate the incoming protocols to Java code. Accordingly, the middleware is advantageously not required to handle all the various protocols from the storage arrays, but only the translated Java code. This is a significant advantage of the invention in that it facilitates handling storage arrays or other systems having many different types of protocols, even proprietary protocols, without the necessity of writing code for different middleware instances. Rather, the invention enables the middleware to communicate directly with a proprietary storage array as if it had a native Java or other language, e.g., C++, Python, etc., library.

Figure 8:
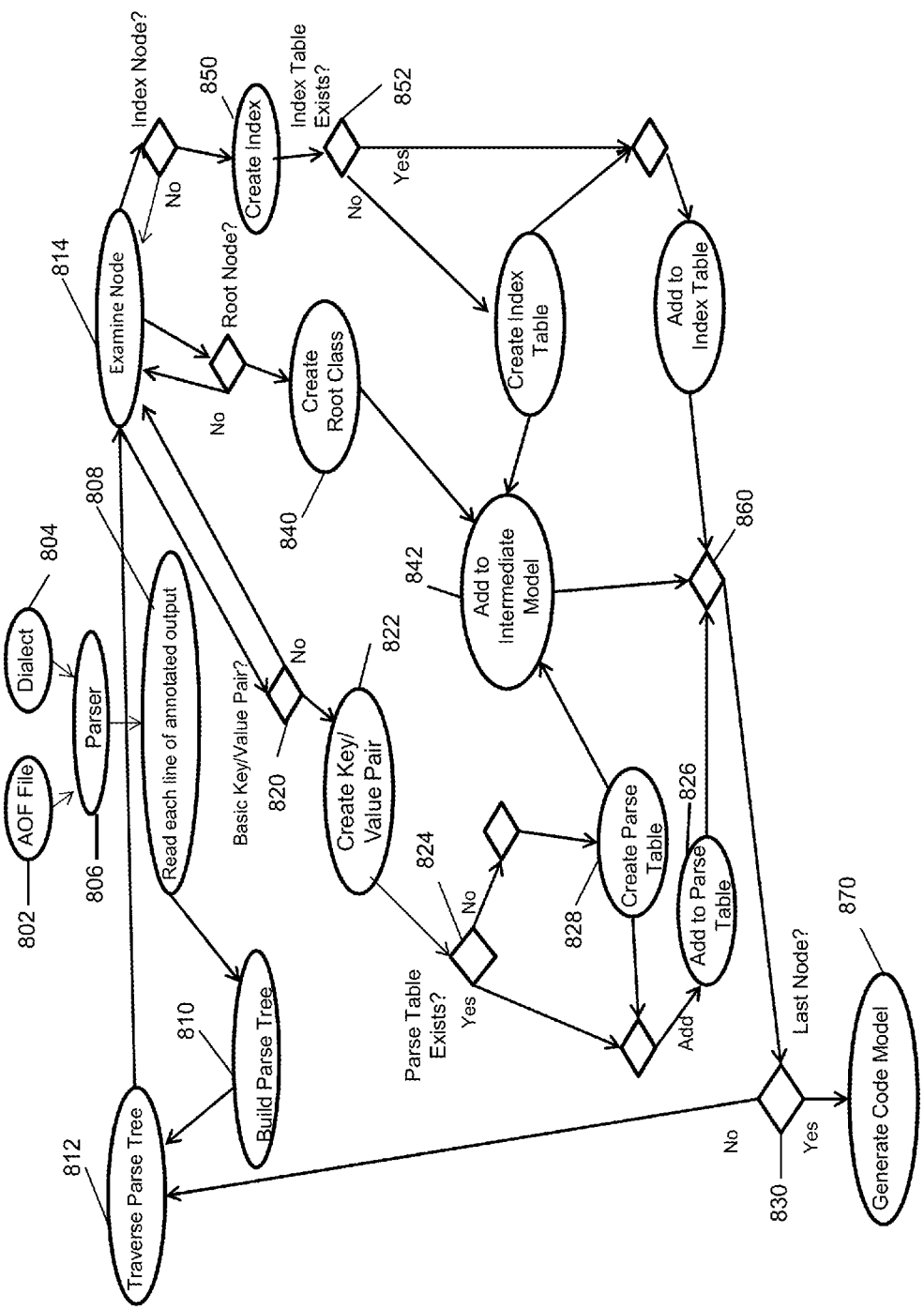
FIG. 8 is a diagrammatic view illustrating in more detail a process in accordance with the invention for parsing an input file to generate a code model.

FIG. 8 illustrates a preferred embodiment of a process that may occur in steps 306 and 308 of the process illustrated in FIG. 3. This process corresponds to one that may operate between the annotate and compile operations illustrated in FIG. 4. As will be described below, this process goes through all lines in the input AOF file, parses the file according to the rules defined by the grammar to create a parse tree, traverses the tree examining each node, and stores the results in a custom hierarchical data structure (intermediate model) constructed for this purpose. The various operations shown in FIG. 8 such as "create class", "create key/value pair", etc., serve to fill in the intermediate model data structure, which will be used to generate the actual source code that will be used to process live data, as will be described.

Referring to the figure, an AOF file 802 and a dialect 804 may be input to a parser 806. Each line of annotated output from the parser is read at 808 and a parse tree is built at 810. Upon traversing the parse tree, if a root node is encountered, a class may be created and stored in the intermediate model. If a key/value pair is encountered, a corresponding field may be added to an existing class or to an existing parse table in the intermediate model. This means that each line of the file will be read for key word variables such as @Date, @String, etc., and separated out so that rules may be applied to each line. The parse tree may be traversed at 812 and each node of the tree may be examined at 814 to determine whether the node is an index node, a root node or a basic key/value pair. If the node represents a basic key/value pair at 820, a key/value pair is created at 822. Otherwise, the process returns to the examine node step 814 after creating the key/value pair at 822. The process then determines at 824 whether a parse table exists. If a parse table already exists, the key/value pair may be added to the parse table at 826. Otherwise, if at 824 a parse table does not exist, one may be created at 828 and the key/value pair added to the parse table at 826. At 830, a determination may be made as to whether that node was the last node. If not, the process returns to the traversed parse tree step at 812 and examines another node at 814.

If the node examined at 814 is a root node, a root class may be created at 840 and added to an intermediate model at 842. The intermediate model comprises a data structure that will hold the parsed lines of the input AOF file. If instead the node examined at 814 is an index node, an index may be created at 850, and at 852 a determination may be made as to whether an index table exists. If not, an index table is created at 854 and added to the intermediate model 842. Otherwise, if an index table already exists, the index data may be added to the existing index table at 856, and the process loops back at 830 to repeat and examine the next node of the parse tree. Once the last node of the parse tree has been examined, the process proceeds to the step of generating a code model at 870. This step will be described below in connection with FIG. 9.

Figure 9:
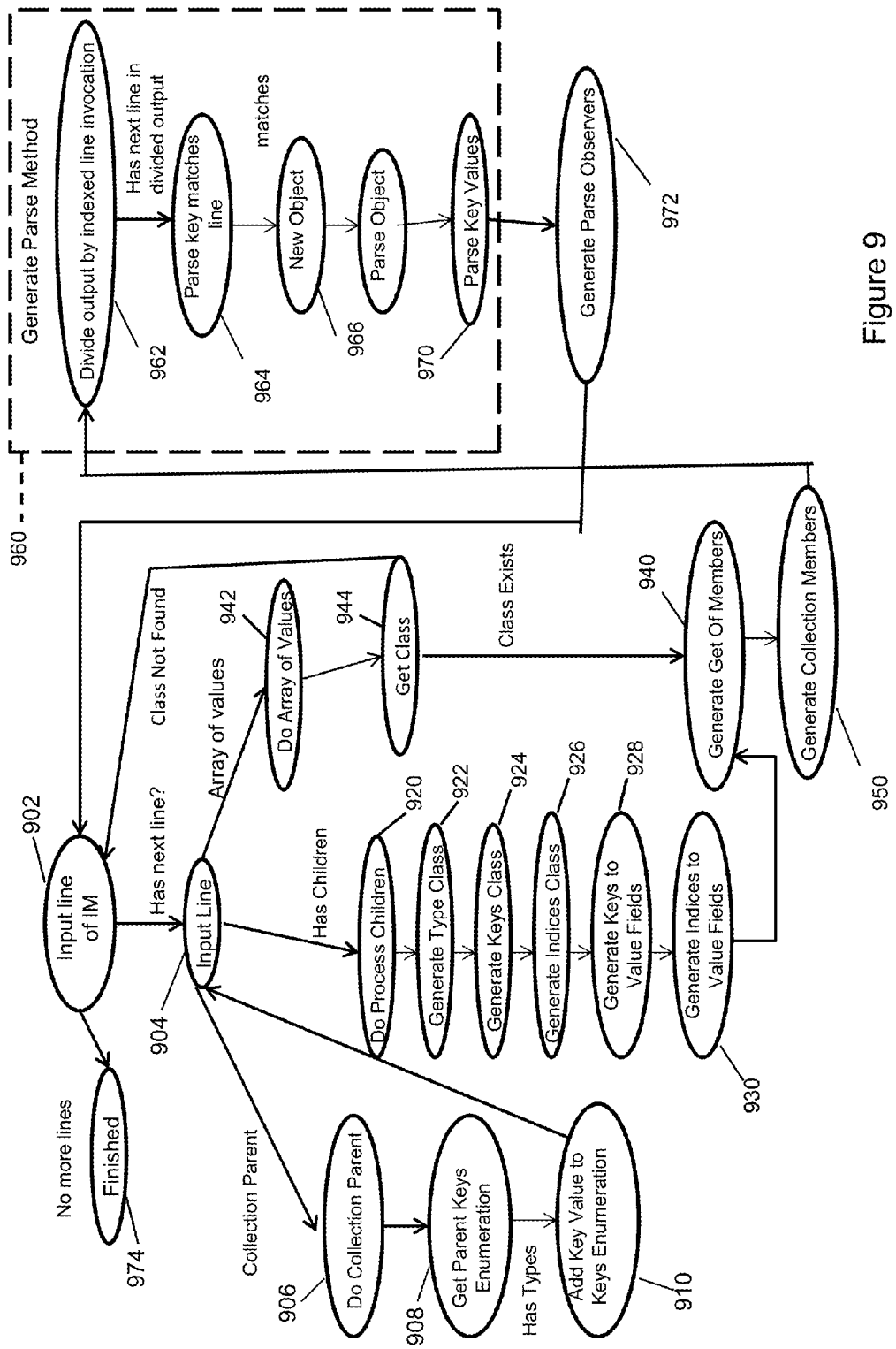
FIG. 9 is a diagrammatic view illustrating in more detail the generation of the code model of the process of FIG. 8.

FIG. 9 illustrates the details of an embodiment of the generate code model step 870 of FIG. 8. Starting at 902, the AOF file is read in and parsed. During the parse step, the characteristics of each line are determined and embedded in the intermediate model 842 which comprises a tree of data structures, each node representing a data structure instance. At 904 the process looks at each input line and determines its characteristics and reads its key value variables. If the input line comprises a collection parent, the process may proceed to 906 which initiates a collection parent process. This process obtains a corresponding parent keys enumeration at 908 that determines whether the collection parent has types, and adds the line of key value variables to a keys enumeration mapping at step 910. The enumeration steps use the enumerations such as of a value string, etc., and build key value variable fields to map the live data such as operational status data for a disk. The enumeration step 908 maps key value variables to actual values in advance and indicates the keys and possible values. From 910, the process returns to step 904 to obtain the next input line.

If the next input line has children, the process proceeds to step 920 "do process children" which analyzes the input line, and generates, as appropriate, type classes at 922, key classes at 924 and indices classes at 926. For instance, for a parent disk class, a disk type class will be created at 922, and at 924 the keys of the disk will be stored in the keys class for mapping the keys to values. Similarly, a disk class may have indices for multiple disks. At 928, keys to value fields are generated, and at 930 indices to value fields are generated. For instance, a disk may have a type class, and the keys would be the enumeration of the types of disk classes, and possibly disk indices for specific disks. If a disk has a serial number, for example, the disk class may generate a function "get serial number" for the disk. There will be a key value variable for serial number inside of "disk" that the process will inspect to obtain the key and return the value. There may be a collection class that will be determined by the disk class. From step 930, the process may proceed to step 940 "generate get of members" which generates collection members and maps the operational status, key value fields and indices, for example, for a particular disk to the collection members. This step may also obtain multiple values for a particular collection as well as the children for particular type classes.

If at step 904 the input line is an array of value variables, the process may proceed to step 942 "do array of values" to get the class at 944 and map the value variables to the class, if it exists. If the class exists, the process proceeds to step 940. Otherwise, it returns to the next input line at 902. Following step 940, the process proceeds to step 950 at which collection members are generated. This step generates the code for multi-value fields.

The generate parse method steps shown at 960 illustrate parsing of the output from the storage arrays. Every type class may have a function called "parse" that accepts a subset of the output. There may be multiple disks, for example, corresponding to the subset of the response object. A new disk object would be initialized for a disk. At step 962, the parse method divides the output from the array by indexed lines so that they correspond to a particular disk. This takes the output response from the array and initializes the data structure for the particular disk. The process matches parse keys to lines at 964, to new objects at 966, to parse objects at 968 and to parse key values at 970. It parses each input line and determines whether keys in that line correspond to a particular mapping, and stores the values. These parse steps add content to the parse method. At 972, the "generate parse observers" step operates to obtain multiple values for a collection. It provides information for key events that may occur. Next, the method returns to 902 to get the next line, and repeats the process. If there is an array of values, for instance, it takes the next one and repeats. If there are no additional lines, the process finishes at 974.

At each input line, there is a context. It is known whether the line is an object of a child or is within a disk class, for example. As the process proceeds, it generates code that can be applied to raw output from the storage arrays. Since the raw output is annotated, it is known how the raw output will look. It is, therefore, known how to handle the live output from the storage array so that the appropriate code may be generated. The generated code is code that did not exist previously, and it can be reused and regenerated many times as the response objects change. Essentially, the code defines specific instances of types that may occur in a real system, and serves as a dictionary that indicates how to analyze and translate different operations.

A significant aspect of the invention is that it generates generic source code for all the various fields of the response object, such as for disks, for instance, and provides relevant data structures and the code that is required to initialize data structures to handle live data. The code and the data structures can handle multiple instances of response object outputs without the necessity of regenerating the code for each different output and/or output protocol. Moreover, the invention easily handles variations as the system output response object changes. Accordingly, the invention eliminates the need for generating specific code to handle specific instances of system output, and avoids the necessity of maintaining multiple different variations of such specific code. Thus, the invention substantially eliminates and reduces the resources and effort previously required to provide individualized middleware to handle different systems and applications.

While the foregoing has been with reference to particular embodiments of the invention, it will be appreciated by those skilled in the art that changes may be made to these embodiments without departing from the spirit and principles of the invention as defined by the appended claims.

The invention claimed is:

1. A method of automatically generating middleware source code for interfacing a system having multiple disparate components of different types and with multiple different protocols for communications with multiple applications having different formats, comprising:

capturing one instance of a raw output response object of the system to an application request;

annotating said one instance of the raw output response object to create an annotated output format ("AOF") file, using a domain specific language that defines keyword terms that replace key values in the raw output response object with corresponding key value variables used to represent said key values, said annotating comprising annotating said AOF file to handle said multiple different protocols;

parsing said AOF file to extract key said keyword terms and key value variables from said parsed AOF file;

mapping said extracted keyword terms and key value variables to an intermediate model data structure by examining AOF file entries for attributes comprising key/value pair, a root class, and an index, wherein said intermediate model data structure comprises a hierarchical data structure having a plurality of nodes and said mapping comprises mapping said entries to nodes based upon the attributes;

traversing said intermediate model data structure to generate a code model;

compiling said code model into said middleware source code; and automatically converting, using said middleware source code, additional application request objects from said different protocols to said multiple disparate components of said system or corresponding response objects from said multiple disparate components of said system to said different protocols.

2. The method of claim 1, wherein said domain specific language comprises predefined key value variables that replace actual key values in said one instance of said response object to represent generic key values in said AOF file, and wherein said parsing comprises extracting said keyword terms and key value variables from each line of said AOF file.

3. The method of claim 2, wherein said parsing comprises analyzing lines of said output response object in accordance with predefined rules of a dialect selected in according to attributes of said response object.

4. The method of claim 1, wherein said hierarchical data structure comprises a parse tree has having multiple nodes, and said code model is generated after all nodes of said parse tree have been examined.

5. The method of claim 1, wherein said middleware source code further comprises parsers for said multiple different protocols for translating the response objects received from the system to a format of an application.

6. The method of claim 1, further comprising creating automatically multiple middleware instances for said multiple different protocols, said middleware instances comprising a domain model and output parsers for processing said response objects to provide said AOF files and associated dialects to said middleware source code.

7. The method of claim 1, wherein said intermediate model data structure comprises multiple lines, and the method further comprises parsing each line of said intermediate model data structure, and reading each line to determine characteristics and key value variables of the line to generate said code model.

8. The method of claim 7, wherein upon determining that a line comprises a collection parent, determining type and key value variables of said collection parent, and creating corresponding key value variable fields in said intermediate model data structure for mapping of data.

9. The method of claim 7, wherein upon determining that a line has one of children of a parent or an array of values, said creating comprises creating fields in the intermediate model data structure for key values corresponding to said one of children or array of values, and generating collection members for generating said source code for handling live data.

10. The method of claim 1, wherein said automatically converting comprises converting said application request objects to said multiple different protocols, and communicating said converted request objects to said system.

11. The method of claim 1, wherein said system components comprise a plurality of storage arrays of different types having said multiple different protocols, and wherein said middleware source code translates a request object from an application to the multiple different protocols and transfers the translated request objects to corresponding storage arrays, and wherein said method further comprises converting in the compiled middleware source code a plurality of response objects from said storage arrays having said multiple different protocols to the format of said application.

12. A non-transitory computer readable storage medium storing instructions for controlling the operation of a computer to perform a method of automatically generating middleware source code for interfacing a system having multiple disparate components of different types and with multiple different protocols for communications with multiple applications having different formats, comprising:

capturing one instance of a raw output response object of the system to an application request annotating said one instance of the raw output response object to create an annotated output format ("AOF") file, said AOF file having been created using a domain specific language that defines keyword terms that replace key values in the raw output response object with corresponding key value variables used to represent said key values, said annotating comprising annotating said AOF file to handle said multiple different protocols;

parsing said AOF file to extract extracting key said keyword terms and key value variables from said parsed AOF file;

mapping said extracted keyword terms and key value variables to an intermediate model data structure by examining AOF file entries for attributes comprising key/value pair, a root class, and an index, wherein said intermediate model data structure comprises a hierarchical data structure having a plurality of nodes and said mapping comprises mapping said entries to nodes based upon the attributes;

traversing said intermediate model data structure to generate a code model;

compiling said code model into said middleware source code; and automatically converting, using said middleware source code, additional application request objects from said different protocols to said multiple disparate components of said system or corresponding response objects from said multiple disparate components of said system to said different protocols.

13. The non-transitory computer readable storage medium of claim 12, wherein said domain specific language comprises predefined key value variables that replace actual key values in said one instance of said response object to represent generic key values in said AOF file, and wherein said parsing comprises extracting said key keyword terms and key value variables from each line of said AOF file.

14. The non-transitory computer readable storage medium of claim 13, wherein said parsing comprises analyzing lines of said output response object in accordance with predefined rules of a dialect selected in according to attributes of said response object.

15. The non-transitory computer readable storage medium of claim 12, wherein said middleware source code further comprises parsers for said multiple different protocols for translating the response objects received from the system to a format of an application.

16. The non-transitory computer readable storage medium of claim 12, said intermediate model data structure comprises multiple lines, and the method further comprises parsing each line of said intermediate model data structure, and reading each line to determine characteristics and key value variables of the line to generate said code model.

17. The non-transitory computer readable storage medium of claim 16, wherein upon determining that a line comprises a collection parent, determining type and key value variables of said collection parent, and creating corresponding key value variable fields in said intermediate model data structure for mapping of data.

18. The non-transitory computer readable storage medium of claim 16, wherein upon determining that a line has one of children of a parent or an array of values, said creating comprises creating fields in the intermediate model data structure for key values corresponding to said one of children or array of values, and generating collection members for generating said source code for handling live data.

* * * * *